United States Patent
Kuiper et al.

(10) Patent No.: US 7,230,771 B2
(45) Date of Patent: Jun. 12, 2007

(54) ZOOM LENS

(75) Inventors: Stein Kuiper, Eindhoven (NL); Bernardus Hendrikus Wilhelmus Hendriks, Eindhoven (NL); Rudolph Maria Snoeren, Eindhoven (NL); Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 113 days.

(21) Appl. No.: 10/531,975

(22) PCT Filed: Oct. 17, 2003

(86) PCT No.: PCT/IB03/04595

§ 371 (c)(1),
(2), (4) Date: Apr. 20, 2005

(87) PCT Pub. No.: WO2004/038480
PCT Pub. Date: May 6, 2004

(65) Prior Publication Data

US 2006/0028734 A1 Feb. 9, 2006

(30) Foreign Application Priority Data

Oct. 25, 2002 (EP) .................................. 02079473

(51) Int. Cl.
*G02B 1/06* (2006.01)
*G02B 15/14* (2006.01)
(52) U.S. Cl. .................. 359/665; 359/666; 359/832; 359/245; 359/676; 359/683
(58) Field of Classification Search ............. 359/665, 359/666, 832, 245, 676, 683
See application file for complete search history.

(56) References Cited

U.S. PATENT DOCUMENTS

| 4,802,746 | A | 2/1989 | Baba et al. |
| 4,890,903 | A | 1/1990 | Treisman et al. |
| 4,989,958 | A | 2/1991 | Hamada et al. |
| 6,081,388 | A | 6/2000 | Widl |
| 6,271,975 | B1 | 8/2001 | Grupp |
| 6,288,846 | B1 | 9/2001 | Stoner, Jr. |
| 6,449,081 | B1 * | 9/2002 | Onuki et al. ................ 359/245 |
| 6,806,988 | B2 | 10/2004 | Onuki et al. |
| 6,950,219 | B2 | 9/2005 | Onuki et al. |
| 7,142,344 | B2 | 11/2006 | Onuki et al. |
| 2001/0017985 | A1 | 8/2001 | Tsuboi et al. |

FOREIGN PATENT DOCUMENTS

| JP | 2001013306 A | 1/2001 |
| JP | 2001249262 A | 9/2001 |
| WO | WO 9736193 A1 | 10/1997 |
| WO | WO 9918456 A1 | 4/1999 |

* cited by examiner

*Primary Examiner*—Evelyn A. Lester
(74) *Attorney, Agent, or Firm*—Paul Im

(57) ABSTRACT

A zoom lens comprising, from the object side to the image side, a front lens group (72), a controllable lens group, and a rear lens group (74), the controllable lens group comprising a voltage-controlled electrowetting device, which device contains a first fluid (A) and a second fluid (B) having different refractive indices, with at least two first fluid-second fluid interfaces (40,42). The curvatures, and thus the lens power, of these interfaces can be changed independently by supplying a voltage (V1, V2) to electrodes (22,32) of the device, so that no mechanical movement of lens elements is needed.

24 Claims, 10 Drawing Sheets

ZOOM LENS

The invention relates to a zoom lens having at least a first fixed lens group, a second fixed lens group, and a controllable lens group.

The invention also relates to a camera comprising such a zoom lens and to a handheld device comprising such a camera.

A conventional zoom lens comprises a number of solid lens elements having fixed refractive surface curvatures and made of a transparent material like glass or a transparent plastic. These lens elements are grouped in a front lens group at the object side, a rear lens group at the image side, and a controllable lens group between the front group and the rear group. Each of these groups may consist of one or more lens elements. Lens elements of the controllable lens are movable with respect to each other for performing zooming and focusing. Zooming is understood to mean changing the image scale, i.e. selecting the size of the object scene that is imaged, by changing the focal distance of the lens system. The maximum settings of the zoom lens are Tele configuration, wherein a small portion of an object scene is imaged, and wide configuration, wherein a larger portion of an object scene is imaged. By moving lens elements of the controllable lens group, the zoom lens can be set between these two extreme configurations and configurations therebetween. Focusing is understood to mean keeping the selected object scene in focus for every configuration of the zoom lens system.

Because of the required mechanical movement of lens elements, the conventional zoom lens has a large dimension along its optical axis so that it is less suitable for miniaturization. An electric motor, which consumes energy, is used for moving several lens elements. If a zoom lens is to be used in a miniature camera forming part of a small, handheld and battery powered, apparatus such as a mobile phone, the zoom lens should be miniaturized. The conventional zoom lens design is not suited for such use because the electric motor consumes a considerable amount of battery power and the mechanical vulnerability becomes a problem. Moreover, mechanical zooming requires a certain amount of time.

It is an object of the invention to provide a zoom lens which is suitable for a miniature camera. This zoom lens is characterized in that the controllable lens group comprises a voltage-controlled electrowetting device, which device includes a first fluid and a second fluid having different refractive indices and comprises at least two first fluid-second fluid interfaces.

An electrowetting device is a new type of optical component that includes two fluids in a fluid chamber, which fluids are in contact via an interface. Supplying a voltage between two electrodes of the device can change the shape of this interface.

A fluid is understood to mean a substance that alters its shape in response to any force and that tends to flow or to conform to the outline of its chamber. Such a fluid may be a gas, a liquid, and a mixture of solids and liquids capable of flow.

A lens group may consist of only one lens element, but may alternatively comprise two or more lens elements. In the embodiments of the zoom lens described hereinafter, the first and second lens groups are each represented by one lens element, but in practice each of these groups may comprises more lens elements.

An electrowetting device can be configured as a variable-focus lens. In such a lens the fluids have different refractive indices and their interface has the shape of a meniscus.

Application of a voltage to the electrodes of the device causes a change in the curvature of the refractive surface formed by the meniscus and thus a change of its lens power. A zoom lens based on the electrowetting principle and comprising two independently actuated menisci allows zooming, i.e. changing the focal distance of the zoom lens by adapting the voltage supplied to the electrodes associated with one of the menisci. Focusing, i.e. keeping the object in focus for all configurations between Tele and wide, is performed by adapting the voltage supplied to the electrodes associated with the other meniscus.

In this zoom lens system no space needs to be reserved for allowing movement of lens elements, so that the axial dimension of the system is considerably reduced. As motor driven lens elements are no longer required, very fast zooming and focusing can be realized and the electric power for zooming and focusing is considerably reduced, which makes the zoom lens system suitable for battery powering.

It is noted that international patent application WO 97/36193 describes a zoom lens system with position-fixed variable-focus lenses. These lenses are flexible lenses and comprise flexible membranes forming a lens chamber, which is filled with a transparent fluid. The curvature of the membranes, which form the refractive lens surfaces, can be changed, for example by piezo-electric actuators or by changing the fluid volume. The membranes should be strongly deformed for zooming and focusing. The deformations are not directly controlled by a voltage. Moreover, pumping fluid into and from a flexible lens requires electric power.

It is further noted that patent application publication U.S. 2001/0017985 describes an electrowetting optical element capable of controlling its optical transmittance. This element comprises a first, conductive liquid and a second liquid, which have substantially equal refractive indices but differ in transmittance. The liquids do not mix with each other and are contained in a sealed container in such a state that the boundary between them has a predetermined shape. When a voltage is applied between the liquids through electrodes, one of which is in contact with the conductive liquid, the shape of the boundary changes, thereby changing the quantity of transmitted light. The change in boundary shape may also be used to realize a variable-focus lens. Such a lens may be used in a zoom lens system wherein the variable focus lens is arranged between a front lens group at and a relay lens group. This zoom lens system comprises only one variable-focus element, which is used for zooming, whilst focusing is performed by moving the front lens group.

An embodiment of the new zoom lens, which most closely resembles the conventional zoom lens design, has a front lens group at its object side and a rear lens group at its image side. This embodiment is characterized in that the first lens group is the front lens group, the second lens group is the rear lens group, and the electrowetting device is arranged between the first lens group and the second lens group.

Several embodiments of the zoom lens are possible as regards the number of interfaces and the distribution of these interfaces over electrowetting cells.

A first embodiment is characterized in that the electrowetting device comprises one electrowetting cell having two first fluid-second fluid interfaces.

This is the most compact design for an electrowetting device suitable for a zoom lens.

A second embodiment is characterized in that the electrowetting device comprises two electrowetting cells, each having at least one first fluid-second fluid interface.

This embodiment provides more freedom of design.

The performance of this embodiment can be enhanced considerably if it is further characterized in that each electrowetting cell has two first fluid-second fluid interfaces.

This zoom lens thus comprises four interfaces (menisci), which provides a large freedom of design and allows finer tuning and the use of lower voltages.

Preferably, the zoom lens is characterized in that the electrowetting device comprises a first and a second electrowetting cell, each having one first fluid-second fluid interface, and in that a lens stop is arranged between the first and the second electrowetting cell.

A similar performance to that of the embodiment having four interfaces can be achieved with this embodiment, but with a reduced number of interfaces, thus with a simpler device. Use is made of the fact that the device is used more symmetrically, i.e. comparable surface areas of the first and second interface are used for refracting the imaging beam. The stop in a lens system is a diaphragm that restricts the diameter of the imaging beam.

This embodiment having a front lens group at its object side and a rear lens group at its image side may be further characterized in that the first lens group is the front group and the second lens group is the rear group, and in that the electrowetting device is arranged between the first lens group and the second lens group.

Alternatively, this embodiment may be further characterized in that one electrowetting cell forms a front lens group and the second electrowetting cell forms a rear lens group, and in that the first lens group and the second lens group are arranged between the electrowetting cells, the lens stop being arranged between the first lens group and the second lens group.

The succession of fixed and controllable lens groups in this embodiment is totally different from that of a conventional zoom lens.

According to another aspect of the invention, the built-in height of the zoom lens can be further reduced if this lens is further characterized in that it comprises at least one folding mirror arranged between an electrowetting cell and one of the first and second lens groups.

This embodiment allows an arrangement of the main portion of a camera with the zoom lens parallel to the main surface of a device wherein the camera is to be incorporated.

The minimum built-in size is obtained with an embodiment which is characterized in that it comprises two folding mirrors, one at the object side portion and the other at the image side portion of the zoom lens.

With respect to the possible design of the electrowetting cell(s), the zoom lens is preferably characterized in that an electrowetting cell comprises:
  a substantially cylindrical chamber having a cylinder wall, the fluid chamber containing a first fluid and at least one axially displaced second fluid, the fluids being non-miscible, in contact across a meniscus interface, and having different indices of refraction,
  a fluid contact layer arranged on the inside of the cylinder wall,
  a first electrode separated from the first fluid and the at least one second fluid by the fluid contact layer,
  a second electrode acting on the second fluid,
  the fluid contact layer having a wettability by the second fluid which varies under the application of a voltage between the first electrode and the second electrode, such that the shape of the meniscus varies in dependence on the said voltage,
  wherein the wettability of the fluid contact layer by the second fluid is substantially equal on both sides of the intersection of the meniscus with the contact layer when no voltage is applied between the first and second electrodes.

The equal wettability of the fluid contact layer on both sides of the intersection allows a relatively large movement of the second fluid and, as a consequence, a relative great change in the curvature of the meniscus. This is a large importance for a zoom lens.

In this type of zoom lens the number of electrowetting cells, the number of interfaces in these cells, and the sequence of the fixed lens groups and the cells may be as described above herein.

A zoom lens of this type comprising two electrowetting cells may be further characterized in that the two cells share one fluid chamber.

An embodiment of this type of zoom lens which has a considerably reduced built-in height is characterized in that the fluid chamber comprises at least one folding mirror, which is formed by a reflective inclined portion of a fluid chamber wall, which mirror reflects incident radiation at an angle of substantially 90°.

This embodiment is preferably further characterized in that the fluid chamber comprises two folding mirrors, one at the object side portion and the other at the image side portion of the zoom lens.

This embodiment may be further characterized in that the folding mirror at the image side portion is integrated with the front lens group.

In this way the number of elements of the zoom lens is reduced by one, which reduces the manufacturing costs.

All of the above-mentioned embodiments may be further characterized in that the first fluid comprises an insulating liquid and the second fluid comprises a conducting liquid.

Alternatively, these embodiments may be characterized in that the first fluid comprises a vapor and the second fluid comprises a conducting liquid.

As a camera wherein the zoom lens is incorporated is distinguished from conventional cameras by features which are provided by the invention, such a camera forms part of the invention.

As building-in of such a camera in a handheld apparatus provides such an apparatus with a zooming function, such an apparatus also forms part of the invention.

These and other aspects of the invention are apparent from and will be elucidated, by way of non-limitative example, with reference to the embodiments described hereinafter. In the drawings.

The invention can be best elucidated describing first the principle of an embodiment of a variable focus lens which is preferably used as a variable lens element in the zoom lens.

Figure 1:
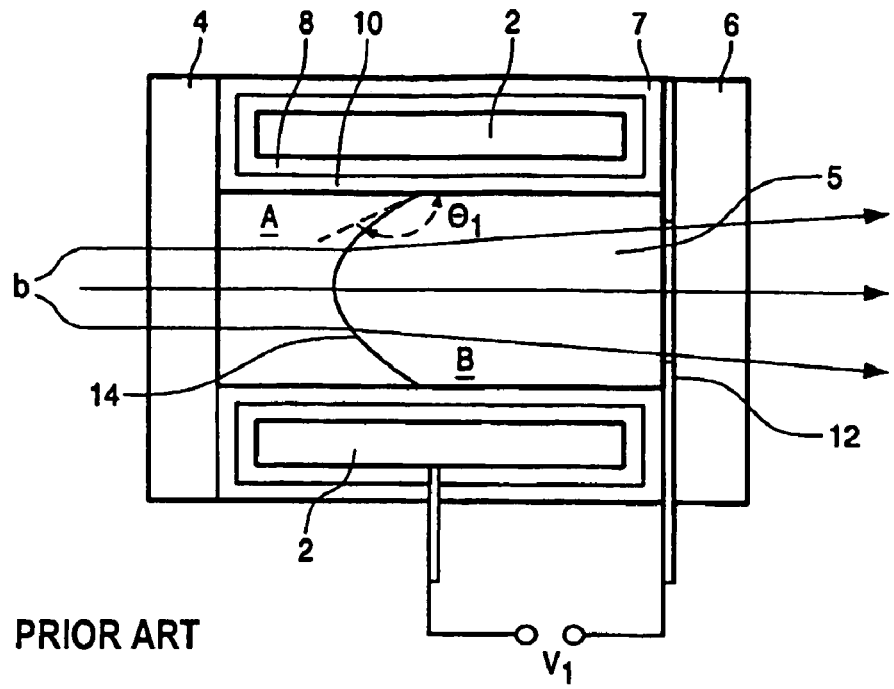
FIG. 1 shows an electrowetting cell constituting an adjustable lens and the curvature of the meniscus in the cell when a low voltage is supplied to its electrodes.
Figure 2:
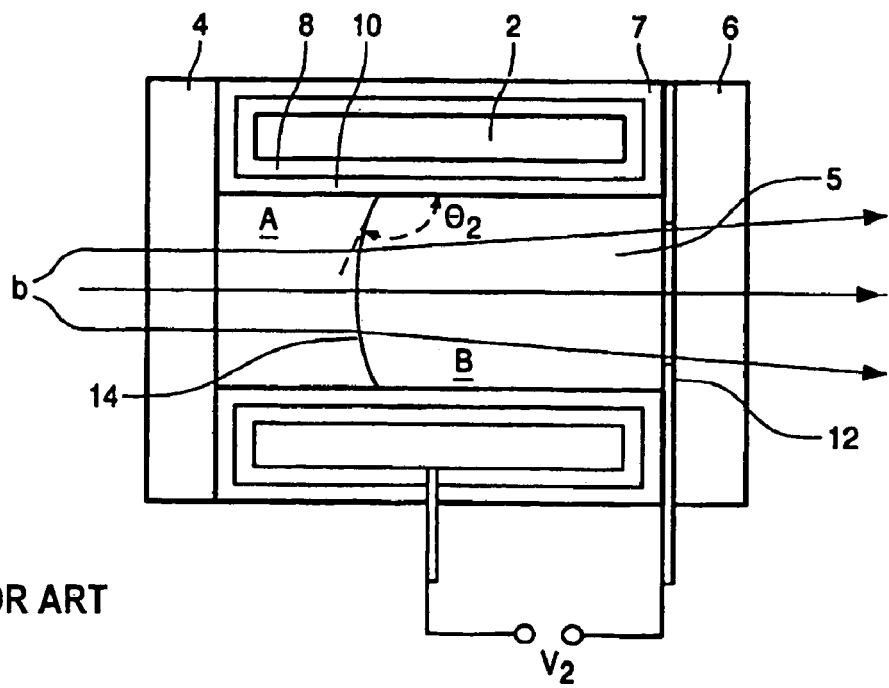
FIG. 2 shows the curvature of the meniscus when an intermediate voltage is supplied.
Figure 3:
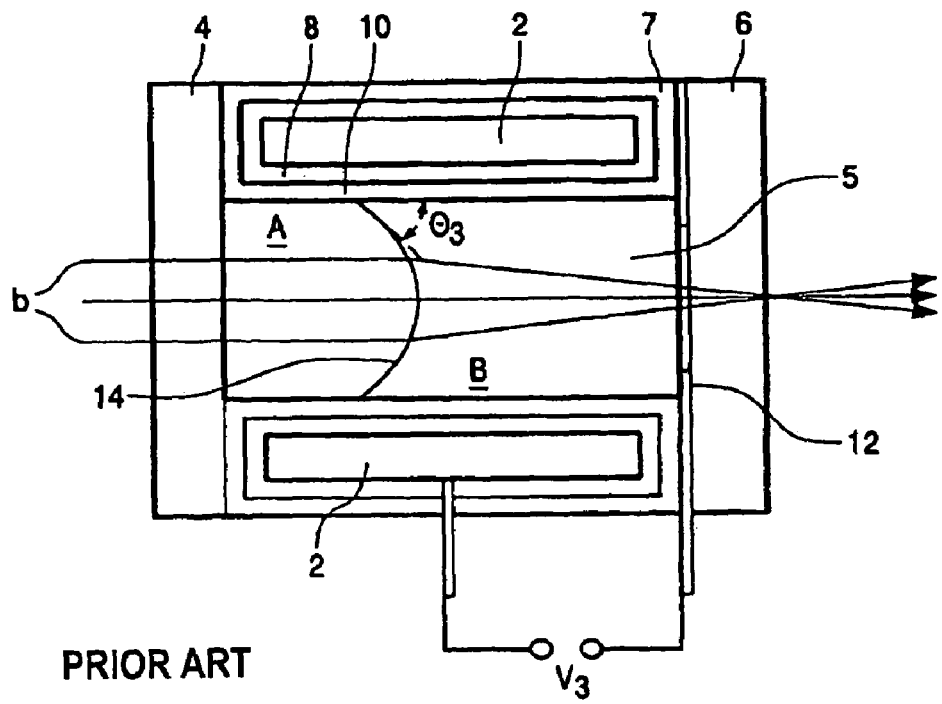
FIG. 3 shows the curvature of the meniscus when a high voltage is supplied.

FIGS. 1 to 3 show a cross-section of such a lens 1. The lens comprises a cylindrical first electrode 2 forming a capillary tube, sealed by means of a transparent front element 4 and a transparent back element 6 to form a fluid chamber 5 containing two fluids. The electrode 2 may be a conducting coating applied on the inner wall of a tube 7.

In this embodiment the two fluids consist of two non-miscible liquids in the form of an electrically insulating first liquid A, such as a silicone oil or an alkane, referred to herein further as "the oil", and an electrically conducting second liquid B, such as an aqueous salt solution. The two liquids are preferably arranged so as to have equal densities so that the lens functions independently of orientation, i.e. without dependence on gravitational effects between the two liquids. This may be achieved by an appropriate choice of the first liquid constituent; for example alkanes or silicone oils may be modified by addition of molecular constituents to increase their density to match that of the salt solution.

Depending on the choice of the oil used, the refractive index of the oil may vary between 1.25 and 1.60. Likewise, dependent on the amount of salt added, the salt solution may vary in refractive index between 1.33 and 1.48. The fluids in this embodiment are selected such that the first fluid A has a higher refractive index than the second fluid B.

The first electrode 2 is a cylinder of inner radius typically between 1 mm and 20 mm. The electrode 2 is formed from a metallic material and is coated with an insulating layer 8, for example of parylene. The insulating layer has a thickness of between 50 nm and 100 µm, with typical values lying between 1 µm and 10 µm.

The insulating layer 8 is coated with a fluid contact layer 10 which reduces the hysteresis in the contact angle of the meniscus with the cylindrical wall of the fluid chamber. The fluid contact layer is preferably formed from an amorphous fluorocarbon such as Teflon™ AF1600 produced by DuPont™. The fluid contact layer 10 has a thickness of between 5 nm and 50 µm. The AF1600 coating may be produced by repeated dip coating of the electrode 2. A homogeneous layer of material of substantially uniform thickness is formed thereby since the cylindrical sides of the electrode are substantially parallel to the cylindrical electrode. Dip coating is performed by dipping the electrode whilst moving the electrode into and out of the dipping solution along its axial direction. The parylene coating may be applied by chemical vapor deposition. The wettability of the fluid contact layer 10 by the second fluid is substantially equal on both sides of the intersection of the meniscus 14 with the contact layer 10 when no voltage is applied between the first and the second electrode.

A second, annular electrode 12 is arranged at one end of the fluid chamber, in this case adjacent the back element 6. At least a portion of the second electrode is arranged in the fluid chamber such that the electrode acts on the second fluid B.

The two fluids A and B are non-miscible so that they tend to separate into two fluid bodies with a meniscus 14 in between. When no voltage is applied between the first and second electrode 2 and 12, the fluid contact layer has a higher wettability with respect to the first fluid A than the second fluid B. Due to electrowetting, the wettability by the second fluid B varies upon application of a voltage between the first electrode and the second electrode, which tends to change the contact angle of the meniscus at the three-phase line. The three-phase line is the line of contact between the fluid contact layer 10 and the two liquids A and B. The shape of the meniscus is thus variable in dependence on the applied voltage. The meniscus between the first fluid and the second fluid is called concave if the meniscus is hollow as seen from the fluid having the higher refractive index. If this fluid is regarded as a lens, this lens would normally be called concave if the meniscus is concave according to the definition in the previous sentence.

Referring now to FIG. 1, when a low voltage $V_1$, e.g. between 0 V and 20 V, is applied between the electrodes, the meniscus adopts a first concave meniscus shape. In this configuration, the initial contact angle $\theta_1$ between the meniscus and the fluid contact layer 10 measured in the fluid B is, for example, approximately 140°. Since the first fluid A has a higher refractive index than the second fluid B, the lens formed by the meniscus, here called meniscus lens, has a relatively high negative power in this configuration. A collimated beam b passing through the lens 1 becomes strongly diverged.

To reduce the concavity of the meniscus shape, a higher voltage is applied between the first and second electrodes. Referring now to FIG. 2, when an intermediate voltage $V_2$, e.g. 20 V to 150 V, depending on the thickness of the insulating layer 8, is applied between the electrodes, the meniscus adopts a second concave meniscus shape having a radius of curvature increased in comparison with the meniscus in FIG. 1. In this configuration the intermediate contact angle $\theta_2$ between the first fluid A and the fluid contact layer 10 is, for example, 100°. Since the first fluid A has a higher refractive index than the second fluid B, the meniscus lens in this configuration has a relatively low negative power. The collimated beam b becomes weakly diverged.

To produce a convex meniscus shape, a yet higher voltage is applied between the first and second electrodes. Referring now to FIG. 3, when a relatively high voltage $V_3$, e.g. 150 to 200 V, is applied between the electrodes, the meniscus adopts a convex shape. In this configuration, the maximum contact angle $\theta_3$ between the first fluid A and the contact layer 10 is, for example, approximately 60°. Since the first fluid A has a higher refractive index than the second fluid B, the meniscus lens in this configuration has a positive power. The lens converts the collimated beam b into a converged beam.

Note that, whilst the configuration of FIG. 3 can be achieved using a relatively high power, it is preferred in a practical embodiment that a device comprising the lens as described is adapted to use only low and intermediate voltages in the ranges described. That is to say that the voltage applied is restricted such that the electric field strength in the insulating layer is smaller than 20 V/µm, and excessive voltages causing charging of the fluid contact layer, and hence degradation of the fluid contact layer, are not used.

Note furthermore that the initial, low-voltage configuration will vary in dependence on the selection of the fluids (liquids) A and B, in dependence on their surface tensions. By selecting oil with a higher surface tension, and/or by adding a component, such as ethylene glycol, to the salt solution, which reduces its surface tension, the initial contact angle can be decreased. In this case the lens may adopt a low optical power configuration corresponding to that shown in FIG. 2, and an intermediate power configuration corresponding to that shown in FIG. 3. In any case, the lower power configuration remains such that the meniscus is concave, and a relatively wide range of lens powers can be produced without using an excessive voltage.

Although in the above example the fluid A has a higher refractive index than fluid B, the fluid A may also have a lower refractive index than fluid B. For example, the fluid A may be a (per)fluorinated oil, which has a lower refractive index than water. In this case the amorphous fluoropolymer layer is preferably not used, because it may dissolve in fluorinated oils. An alternative fluid contact layer is e.g. a paraffin coating.

The invention provides a new type of zoom lens by replacing the movable lens elements of a conventional zoom lens by lens elements of the type shown in FIGS. 1–3. The new type of zoom lens can be made substantially more compact and consumes substantially less electric power for the zoom action and the focusing action than a conventional zoom lens. These properties render the new zoom lens very suitable to be built into a miniature camera for small and/or handheld and/or battery-powered apparatuses, for example a mobile phone, a personal digital assistant (PDA), a personal computer camera, an intercom system, and an electronic game.

Figure 4:
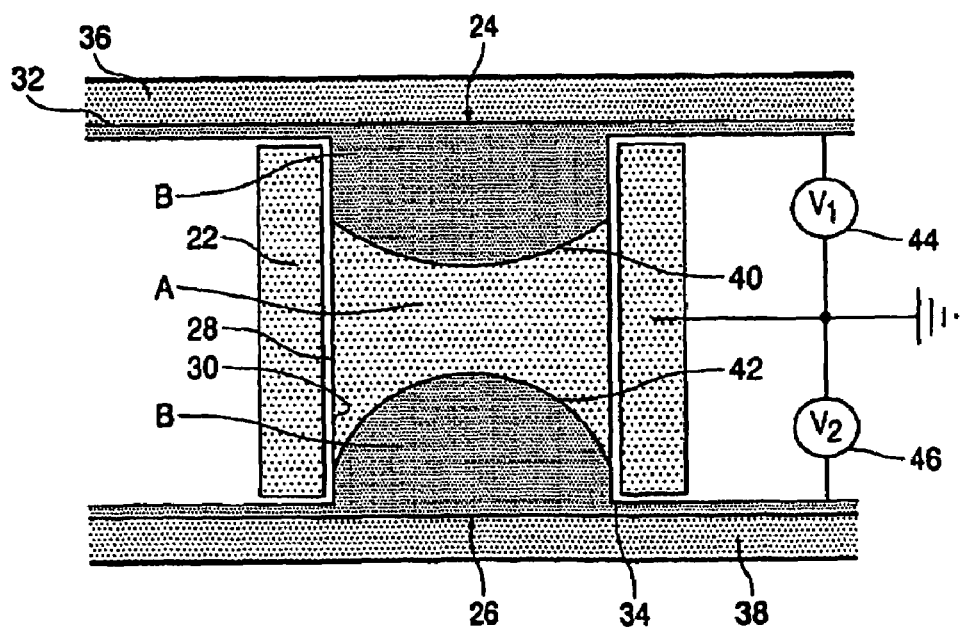
FIG. 4 shows an electrowetting cell having two independently controllable menisci and suitable for use in a zoom lens.

FIG. 4 shows a cross-section of a possible configuration of the controllable lens portion of the new zoom lens, which portion comprises two variable-focus lens elements 24, 26 in the form of an electrowetting device. This device comprises a cylinder 22 of conductive material. The cylinder is coated with an insulating layer 28. The inner side of the cylinder is provided with a fluid contact layer 30. The conductive cylinder 22 forms a common first electrode for the lens elements 24 and 26. The second electrode of the first lens element 24 is constituted by an annular conductive layer 32 having a central transparent area for transmitting radiation. A conductive layer 34 at the lower side forms the second electrode of the second lens element 26. Transparent layers 36 and 38 may cover the conductive layers 32 and 34, respectively. The central portion of the cylinder is filled with a first, transparent and non-conductive liquid or vapor A. At each side of the liquid A, a second, transparent and conductive liquid B is present, which liquid has a lower refractive index than the first liquid A. The non-miscible fluids at the upper side are separated by a first meniscus 40, which forms the first variable-focus lens element. The fluids A and B at the lower side are separated by a second meniscus 42, which forms the second variable-focus lens element.

The curvatures of the menisci and thus the focal distances of the lens elements 24 and 26 can be changed independently from each other by means of controllable voltage sources 44 and 46, respectively. Zooming, i.e. changing the focal distance of the zoom lens, is performed by changing the meniscus curvature of the first lens element 24 through adaptation of voltage $V_1$ of source 44. Focusing, i.e. maintaining a sharp image for different zoom configurations, is performed by changing the meniscus curvature of the second lens element 26 through adaptation of the voltage $V_2$ of source 46. Zooming-in means that the focal distance of the zoom lens system is increased and zooming-out means that this distance is decreased.

Figure 5:
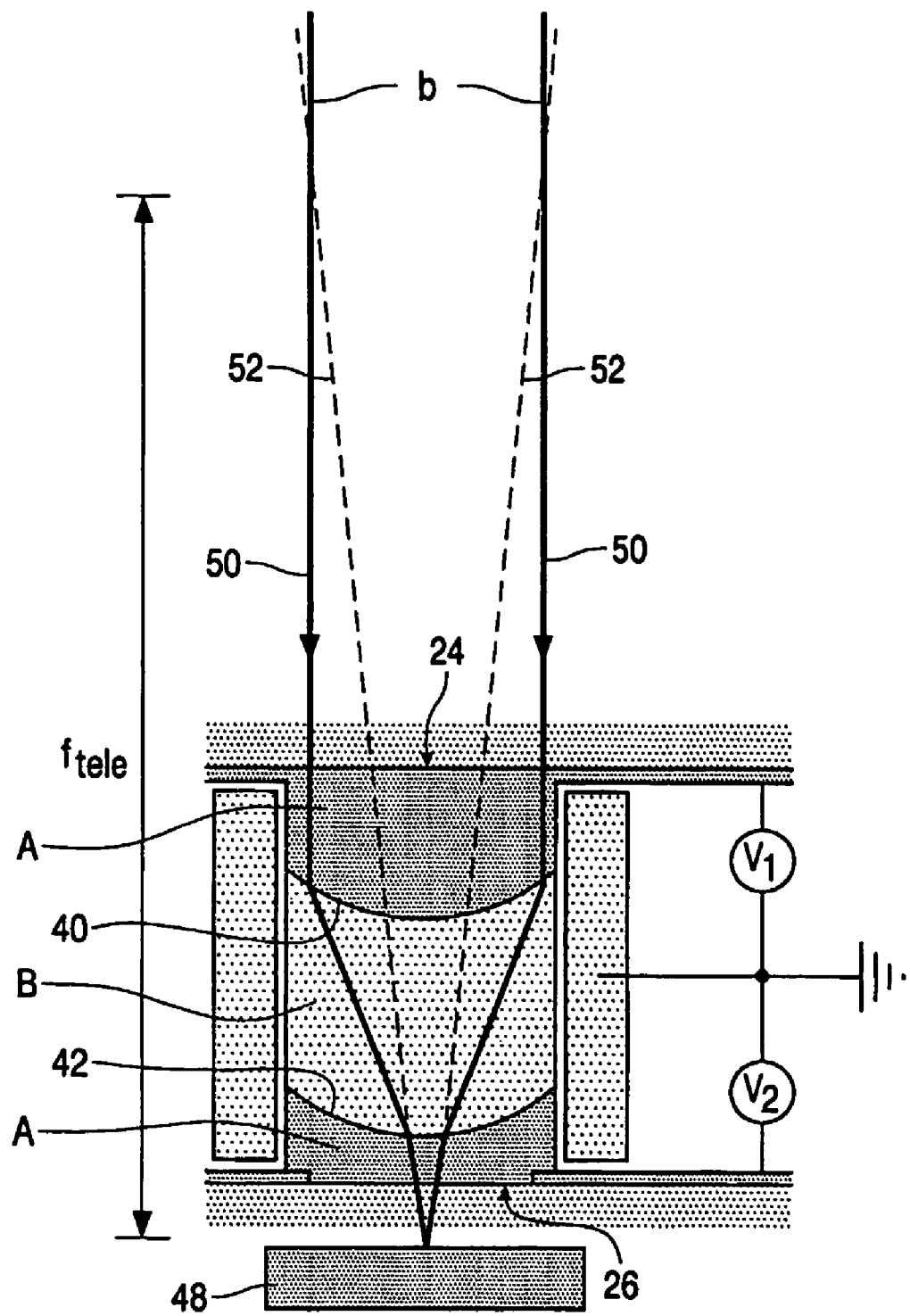
FIGS. 5 and 6 show the curvature of and the path of beam rays through this cell when in the Tele configuration and in the wide configuration, respectively.

FIG. 5 shows the curvature of the menisci and the path of beam rays for the Tele configuration of an embodiment of the electrowetting device similar to the embodiment of FIG. 4, but with liquids A and B interchanged. In the Tele configuration, a small object of the scene is imaged on a film or an electronic sensor, for example a CCD or a CMOS sensor. In this configuration of the zoom lens, the fist meniscus 40 has a convex curvature with a relatively small radius, so that lens element 24 acts as a positive, converging lens element having relative high power. The second meniscus 42 has a concave curvature, so that the second lens element 26 acts as a negative, diverging lens element. The path of the border rays of the incident beam is shown in FIG. 5 by solid lines. The combination of the two lens elements behaves as a lens having its second principal point outside and at the object side of the lens, as indicated by the interrupted lines 52. Thus the focal distance of the combination for the Tele configuration $f_{Tele}$ is relatively great.

Figure 6:
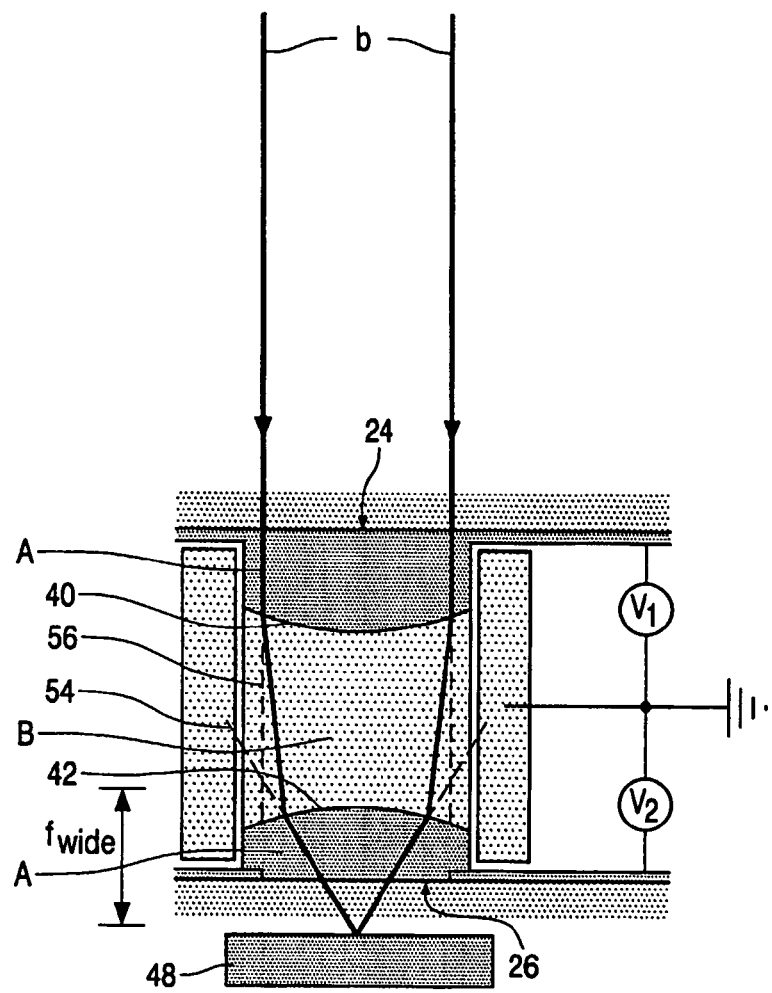

FIG. 6 shows the curvature of the menisci and the path of the beam rays for the wide configuration of the zoom lens. In this configuration, a larger object of the scene is imaged. In the wide position, the convex curvature of the first meniscus 40 still has a convex curvature, but its radius is greater than the radius in the Tele configuration. The curvature of the second meniscus 42 is now convex so that lens element 26 is a positive converging lens. As is shown by the interrupted lines 54,56, the second principal point of the combination of lens elements 24 and 26 is situated near the second lens element 26. The focal distance for the wide position $f_{wide}$ is thus relatively small.

Figure 7:
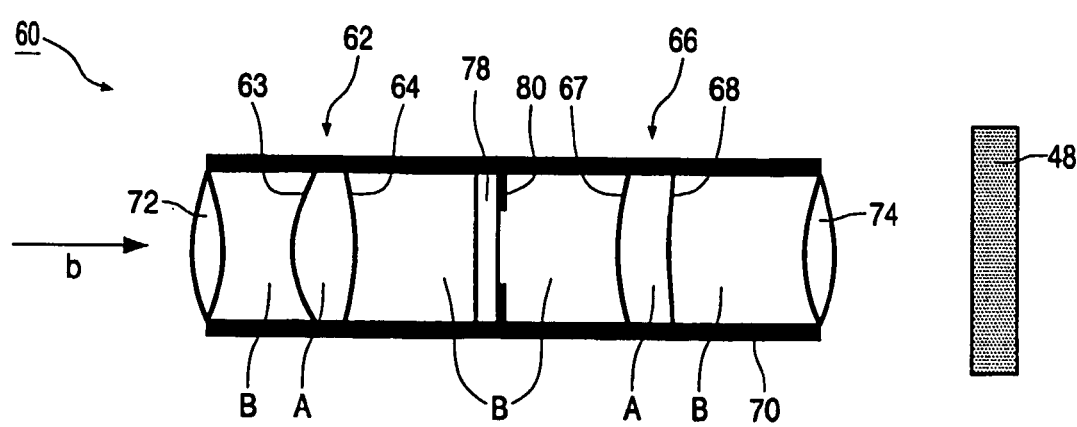
FIG. 7 shows a zoom lens having two electrowetting cells, each having two interfaces.

FIG. 7 shows an embodiment of a zoom lens system 60 comprising two electrowetting lens elements, or cells, 62 and 66 accommodated in the cylindrical structure, which comprises a conductive cylinder, an insulating layer, a fluid contact layer, and second electrodes as described above. FIG. 7 only shows the cylinder 70. The cylinder is closed at the object side by a front group in the form of a solid lens element 72 and at the image side by a rear group in the form of a solid lens element 74. The front element 72 is a positive, convex-convex lens element of highly refractive plastic, such as polycarbonate (PC) or cyclic olefin polymer (COC), and provides desired initial focusing characteristics. This lens element may have at least one aspherical surface to correct for spherical aberrations of the zoom lens. Lens element 12 is followed by a first electrowetting cell 62 having liquid B/ liquid A/ liquid B interfaces. This cell may be sealed by a flat plate 78 of transparent plastic, such as PC or COC, which comprises the field stop 80 of the zoom lens. The plate 78 seals the front side of a second electrowetting cell 66 of liquid B/ liquid A/ liquid B interfaces. The second electrowetting cell is sealed by the rear lens element 74. Lens element 74 is a positive, convex-convex element of highly refractive plastic, such as PC or COC. This lens element may be used as a field flattener, and at least one of its refractive surfaces may be an aspherical surface. Liquid A of the electrowetting cells may be a (per)fluorinated oil having a refractive index of 1.536 and liquid B may be an aqueous solution of salt having a refractive index of 1.336. The refractive index of COC is 1.536.

Each electrowetting cell contains two liquid interfaces or menisci 63,64 and 67,68, respectively, which allows changing of both refractive surfaces of the electrowetting lens element. The lens power change required for zooming or focusing can be distributed over the two refractive surfaces so that per surface a smaller change is needed. This means that the required power change can be realized with lower voltages than those needed for an electrowetting lens element having only one liquid interface. The two electrowetting cells 62 and 64 of the zoom lens may also be replaced by the electrowetting lenses 24 and 26 of FIG. 4.

Figure 8:
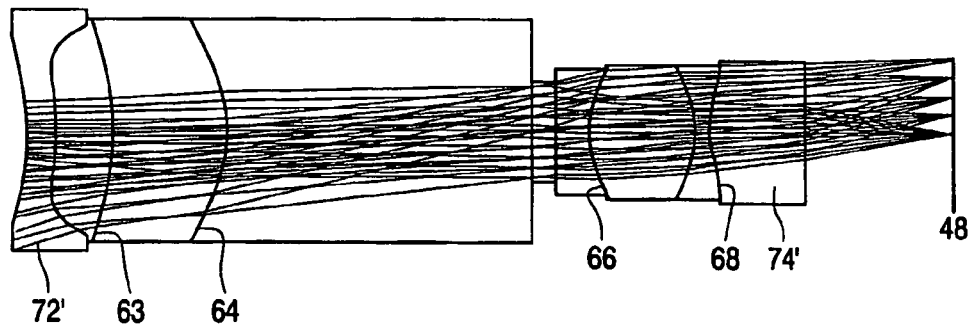
FIGS. 8 and 9 show the curvature of the menisci of and the paths of beam rays through this zoom lens when in the wide configuration and in the Tele configuration, respectively.
Figure 9:
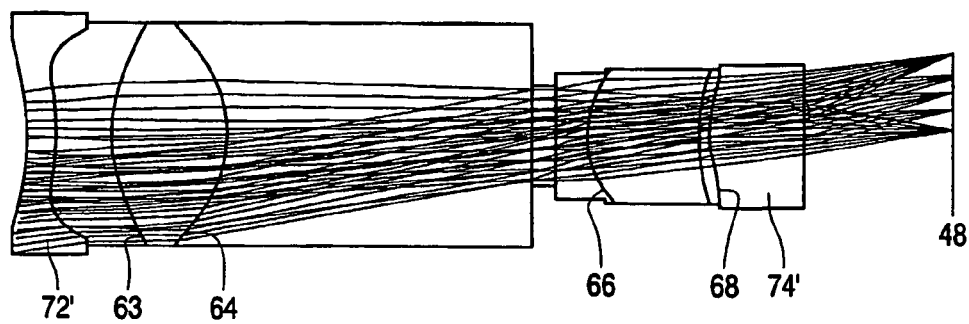

FIGS. 8 and 9 show ray-trace plots of an embodiment of the zoom lens which is similar to that shown in FIG. 7, but with a concave-convex front lens element 72' and a convex-planar rear lens element 74'. FIG. 8 shows the wide configuration and FIG. 9 the Tele configuration. It is immediately clear from FIGS. 8 and 9 that both interfaces 63 and 64 change for zooming and that both interfaces 66 and 68 change for focusing.

A practical embodiment of the zoom lens of FIGS. 8 and 9 shows the following characteristics:

|  | Tele | wide |
| --- | --- | --- |
| Focal length | 7.11 mm | 3.35 mm |
| F/number | 3.4 | 2.6 |
| Angle of view diagonal | 28° | 56° |

This zoom lens is suitable for co-operating with a CMOS sensor 48 of the VGAS type having 640×480 pixels and a pixel size of 4.2 µm.

A zoom lens comprising electrowetting cells instead of solid lens elements has high zoom (and focusing) speed, is directly electrically actuated, has a small size, and can be mass-manufactured at low cost. These properties make the electrowetting zoom lens very suitable for use in a miniature camera to be incorporated in several types of apparatus, especially handheld and battery-powered apparatuses.

A zoom lens for a miniature camera to be built into a handheld apparatus, such as a mobile phone, should have a built-in height as small as possible. As the front lens element of such a camera will usually be accommodated in the front surface of the apparatus (the surface at which the user looks), the built-in height of a zoom lens discussed so far will be determined by the axial length of the zoom lens. This means that the built-in height of the camera, which height is mainly determined by the length of the zoom lens, should fit into the depth of the apparatus, which depth is preferably as small as possible.

Figure 10:
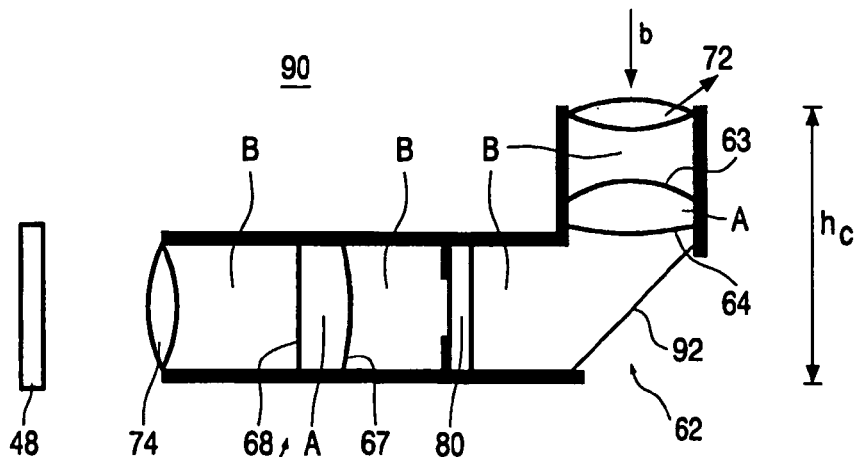
FIG. 10 shows a zoom lens having a folding mirror at the front.

According to a further aspect of the invention, the built-in height of the zoom lens can be substantially decreased by including a folding mirror in the zoom lens. FIG. 10 shows a zoom lens 90 comprising such a mirror 92, which forms part of the wall of the first electrowetting cell 62. The zoom lens of FIG. 10 comprises the same elements as the zoom lens of FIG. 7, which elements are denoted by the same reference numerals. The light beam b from the object scene is incident perpendicularly on the front lens element 72. After having passed the interfaces 63 and 64 of the first electrowetting cell 62, the beam is reflected by the mirror 92 in the horizontal direction if this mirror is arranged at an angle of 45° with respect to the chief ray of the beam b. The other elements of the zoom lens: the transparent plate 78 with the stop 80, the second electrowetting cell 66, the rear lens element 74, and the sensor 48 are arranged in the horizontal direction. This horizontal direction is parallel to the front surface of the apparatus, wherein the camera, i.e. the zoom lens and the sensor 48, should be built in. In this way the built-in height $h_c$ of the camera is reduced to the sum of the height of the mirror and the geometrical length of the light path from the second interface 64 to the outer surface of the front lens element 72.

The mirror is preferably arranged in a first position close to the front lens element 72 where sufficient space is available for this mirror. In the design of FIG. 7, wherein the first interface 63 is close to the front lens, this position is immediately behind the second interface. In another design of the zoom lens, the folding mirror could be arranged in another position, provided that this position is as close as possible to the front lens.

Figure 11:
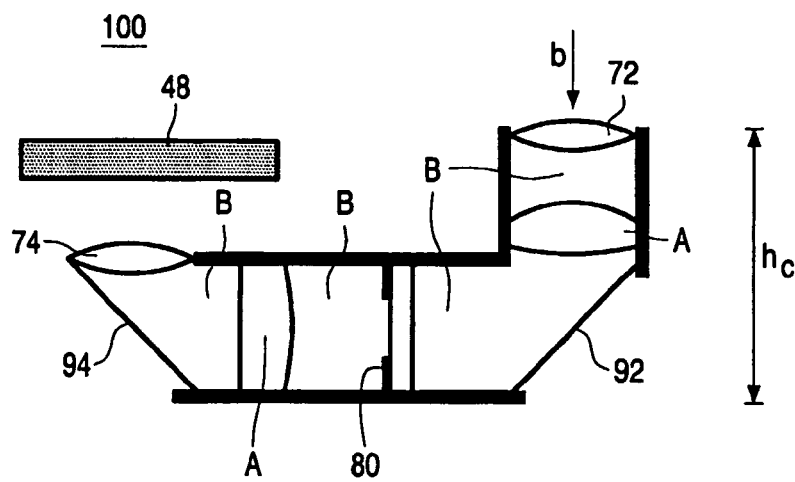
FIG. 11 shows this zoom lens also having a folding mirror at the rear.

The inclusion of a second folding mirror at the rear side of the zoom lens allows a further reduction of the total size of the camera. FIG. 11 shows a zoom lens 100 comprising such a mirror 94. This mirror reflects the beam b, which has passed the electrowetting cell 66, in the vertical direction so that the rear lens element 74 and the sensor 48 can be arranged in this direction. In this way the dimension of the camera in the horizontal direction is reduced, without increasing its built-in height.

Figure 12:
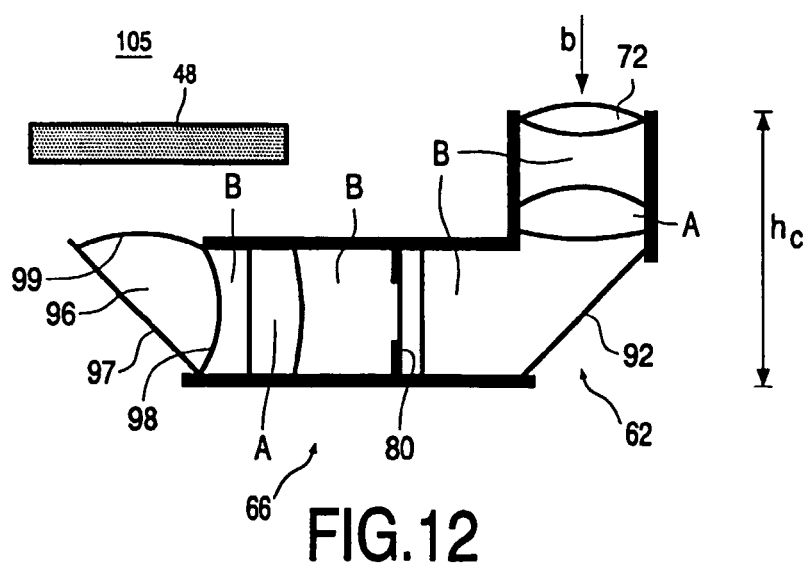
FIG. 12 shows a zoom lens having an integrated folding mirror and lens element at the rear.

As is shown in FIG. 12, the folding mirror can be integrated with the rear lens element into a mirror lens element 96. This mirror lens element has a reflective flat base surface 97 arranged at an angle of, for example, 45° with respect to the chief ray of the beam b, and two curved surfaces 98 and 99 which form the refractive surfaces of the lens element. In this way the number of elements of the zoom lens and thus its manufacturing costs can be reduced. At least one of the curved surfaces of the element 95 may be an aspherical surface, as is the case for the rear lens element 74 in FIGS. 7, 10 and 11.

Figure 13:
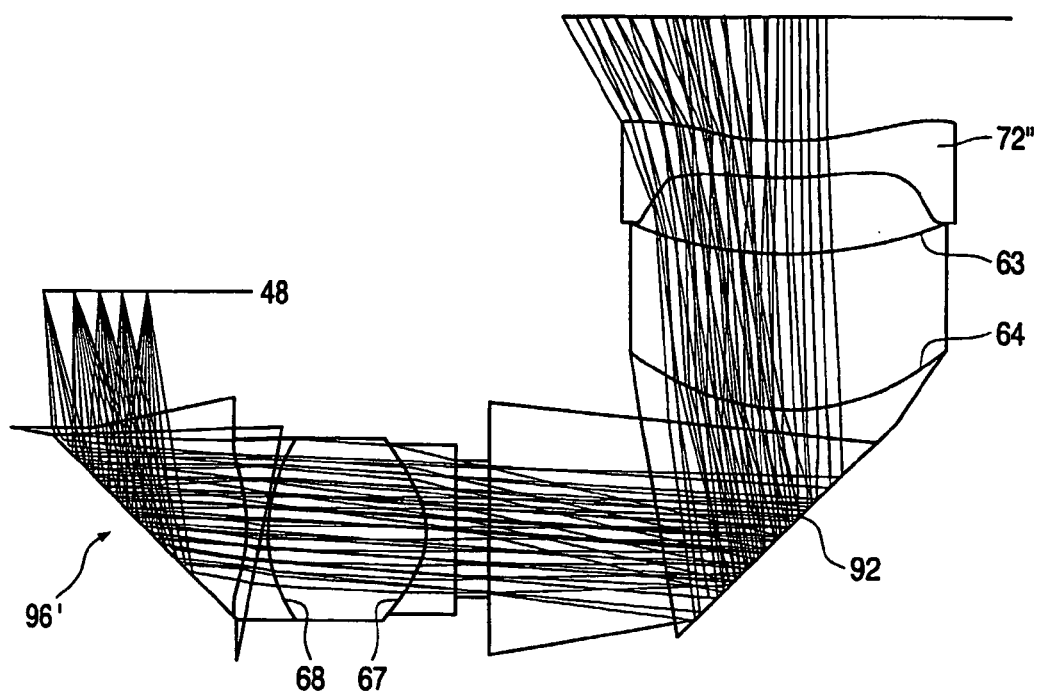
FIGS. 13 and 14 show the curvature of the menisci of and the paths of beam rays through this zoom lens when in the wide configuration and in the Tele configuration, respectively.
Figure 14:
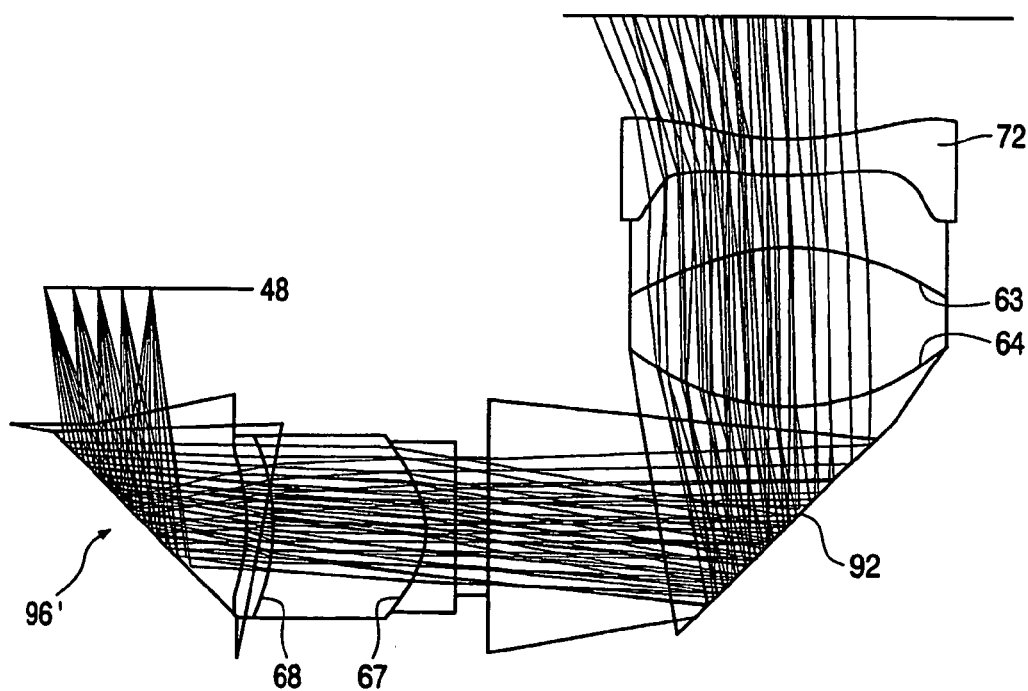

FIGS. 13 and 14 show ray-trace plots of an embodiment of the zoom lens similar to the embodiment of FIG. 12, but with a concave-convex front lens element 72" and a convex-concave rear lens element 96', instead of double convex lens elements. FIG. 13 shows the wide configuration and FIG. 14 the Tele configuration. It is immediately clear from these Figures., that both interfaces 63 and 64 change for zooming and that both interfaces 67 and 68 change for focusing.

The embodiments of the zoom lens shown in FIGS. 7–14, wherein the electrowetting device has two electrowetting cells each comprising two first liquid-second liquid interfaces, has an excellent performance. According to a further inventive step, the number of interfaces or menisci can be reduced from four to two while maintaining the high-level performance. Such a reduction of the number of menisci means a substantial simplification of the electrowetting device in terms of construction and of control of the curvatures of the menisci. The electrowetting device according to the improved design comprises two electrowetting cells each having one meniscus. Essential for the improved design is that the electrowetting cells are arranged at different sides of the lens stop. The stop of a lens system is a diaphragm that restricts the diameter of the imaging beam and prevents stray radiation or radiation from unwanted reflections from being introduced into the imaging beam and causing a reduction in the image contrast. Such a diaphragm ensures that the beam diameters are the same for all imaging beam portions, so that the illumination intensity and the resolution are constant in the image field. The effect of arranging the lens stop between the electrowetting cells is that the two interfaces are used symmetrically, i.e. the central surface areas of the first and second interfaces covered by the imaging beam have approximately the same size. A second interface is then no longer needed in the cells.

Figure 15:
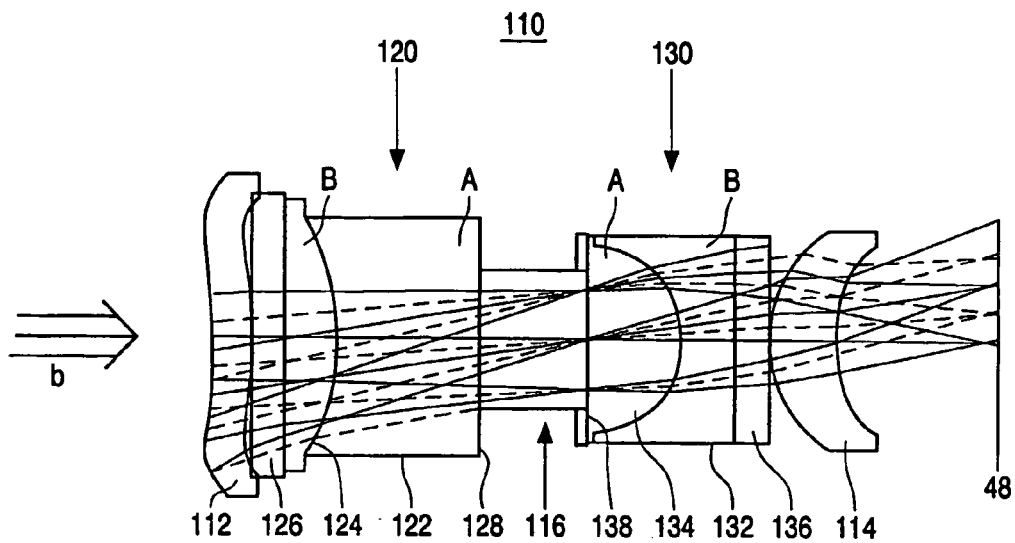
FIGS. 15 and 16 show a first embodiment of a high-performance zoom lens having two electrowetting cells, each with one interface, in the wide and Tele configuration, respectively.
Figure 16:
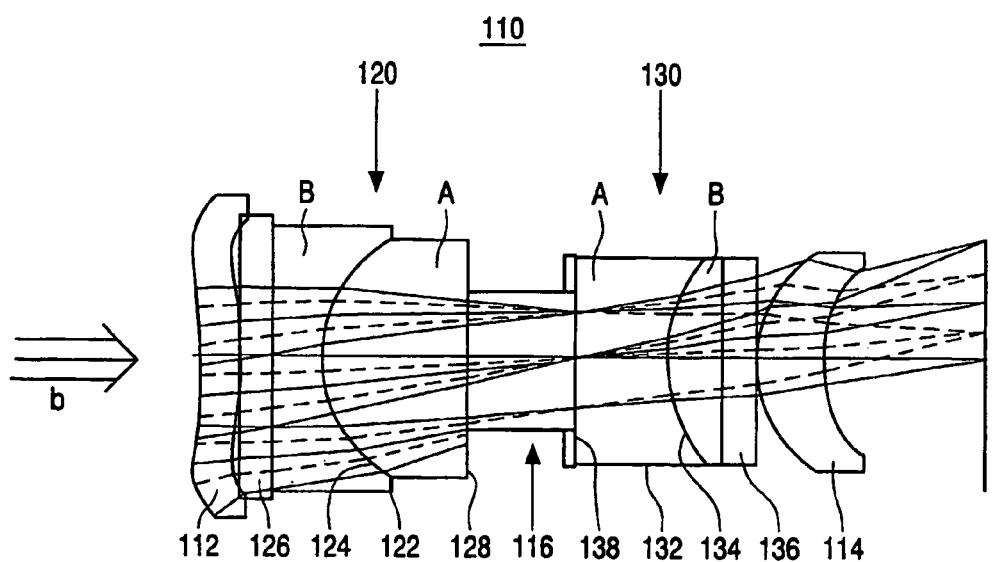

FIGS. 15 and 16 shows a ray-trace plot in the wide configuration and in the Tele configuration of a first embodiment 110 of the high-performance zoom lens having only two interfaces. The lens comprises a fixed front lens comprising, from the object side (left) to the image side (right); a fixed front lens element 112, a first electrowetting cell 120, a second electrowetting cell, and a fixed rear lens element 114. The first electrowetting cell 120 comprises a chamber 132 sealed by a front plate 126 and a rear wall 128 for holding liquids A and B that have an interface in the form of a meniscus 124. The second electrowetting cell 130 comprises a chamber 132 sealed by a rear plate 136 and a front wall 138 for holding liquids A and B that have an interface in the form of a meniscus 134. The stop 116 of the zoom lens is situated between the cells 120, 130. In the wide configuration of the zoom lens, the meniscus 124 is concave and the first cell 120 thus forms a concave lens element, whereas the meniscus 134 is convex and the second cell 130 thus forms a convex lens element. In the Tele configuration, the meniscus 124 is convex and the first cell 120 thus forms a convex lens element, whereas the meniscus 134 is concave and the second cell 130 thus forms a concave lens element.

A practical embodiment of the zoom lens of FIGS. 15 and 16 shows the following characteristics:

|  | Tele | wide |
|---|---|---|
| Focal length | 7.03 mm | 3.61 mm |
| F/number | 3.4 | 2.6 |
| Angle of view diagonal | 28° | 56° |

Figure 17:
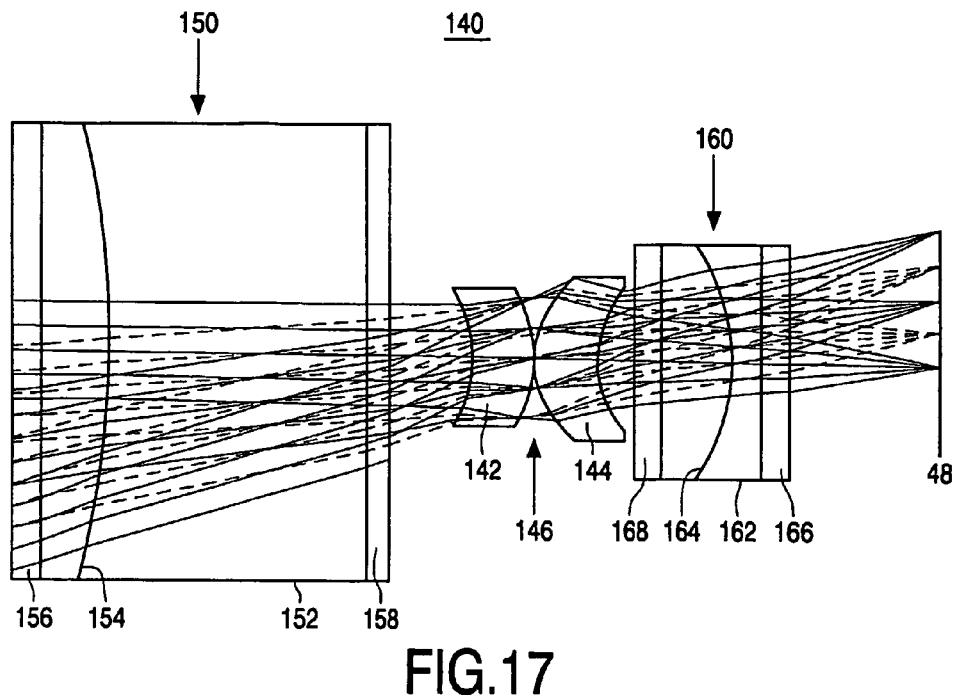
FIGS. 17 and 18 show a second embodiment of such a high-performance zoom lens.
Figure 18:
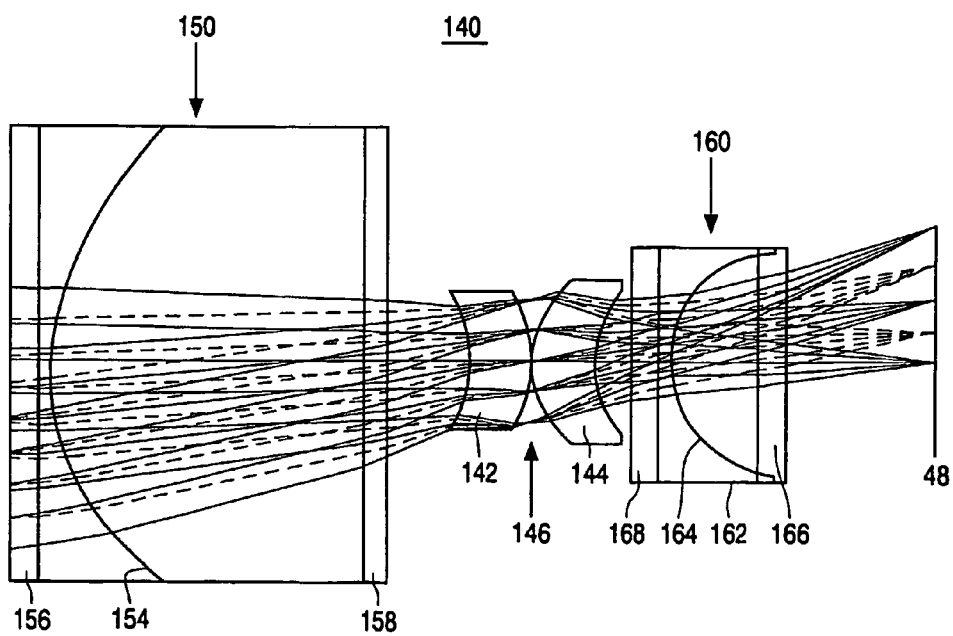

FIGS. 17 and 18 shows a ray-trace plot in the wide configuration and in the Tele configuration, respectively, of a second embodiment 140 of the high-performance zoom lens having only two menisci. The first electrowetting cell 150 is now arranged at the front side of the zoom lens and the second electrowetting cell at the rear end. The first and second lens elements 142 and 144 are positioned between the cells 150 and 160. The lens stop 146 is now between the lens elements 142 and 144. The first electrowetting cell 150 comprises a chamber 152 sealed by a front plate 156 and a rear plate 158 for holding the two liquids A and B that have an interface in the form of a meniscus 154. The second electrowetting cell 160 comprises a chamber 162 sealed by a front plate 168 and a rear plate 166 for holding liquids A and B that have an interface in the form of a meniscus 164. As is immediately clear from FIGS. 17 and 18, switching from the wide configuration to the Tele configuration is again performed by reversing, and adapting the radii of, the curvatures of menisci 154 and 164 by supplying appropriate voltages to the electrodes of the cells as described above.

A practical embodiment of the zoom lens of FIGS. 17 and 18 shows the following characteristics:

|  | Tele | wide |
|---|---|---|
| Focal length | 8.98 mm | 4.79 mm |
| F/number | 3.5 | 2.8 |
| Angle of view diagonal | 28° | 56° |

If so desired, the zoom lens of FIGS. 15, 16 and the zoom lens of FIGS. 17, 18 may also be provided with one or two folding mirrors to shorten the built-in height of these lenses. The first folding mirror will be arranged between front element 112 and the first cell 120 in the embodiment of FIGS. 15, 16 and between the first cell 150 and the first fixed lens element 142 in the embodiment of FIGS. 17, 18. The second folding mirror will be arranged between the second cell 130 and the rear lens element 114 in the embodiment of FIGS. 15, 16 and between the second fixed lens element 144 and the second cell 160 in the embodiment of FIGS. 17, 18.

For some applications of the zoom lens, where even finer tuning of the lens is required, a movable lens group (one or more lens elements) controlled by a motor or otherwise may be included in the zoom lens. The electrowetting device then still provides the same advantages as in the zoom lens described above.

Figure 19:
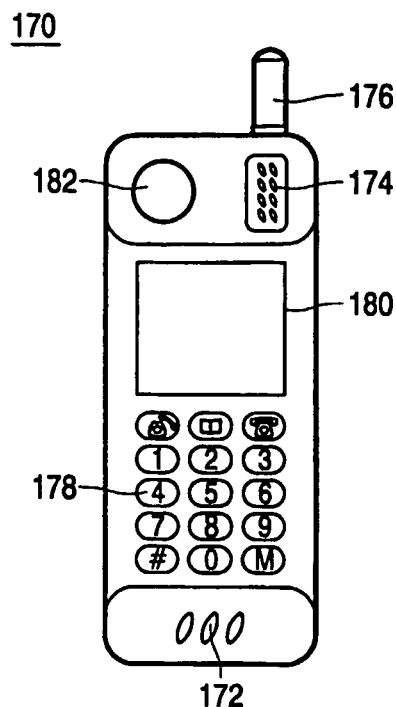
FIG. 19 shows a mobile phone provided with a camera which includes a zoom lens according to the invention.

FIG. 19 shows an example of a handheld apparatus wherein the zoom lens of the invention can be used. The apparatus is a mobile phone 170 shown in front view in FIG. 19. The mobile phone has a microphone 172 which inputs the user's voice as data, a loudspeaker 174 which outputs the voice of a communicating partner, and an antenna 176 which transmits and receives the communicating waves. The mobile phone further comprises an input dial 178 by means of which the user inputs data, such as a phone number to be dialed, and a display 180, for example a liquid crystal display panel. This panel may be used to display a photograph of the communicating partner or of the user, or to display data and graphics. A data processing unit (not shown) is included in the mobile phone for processing the input data and the received data.

The phone 170 is provided with a miniature camera 182 comprising a zoom lens as described above for photographing a scene, graphics, or data to be communicated to the partner or the user. Of this camera only the entrance surface 184 of the first lens element of the zoom lens is visible. This element may be the front lens element 24, 72, or 112 as shown in FIG. 4, in FIGS. 7, 8, 10, 11, 12, 13, and in FIG. 15, respectively, or the first electrowetting cell 150 shown in FIG. 17. The other elements of the camera, i.e. the two electrowetting cells and the rear lens or, for the embodiment of FIG. 17, the two fixed lens elements and the second electrowetting cell, and the sensor may be arranged along a line perpendicular to the front surface of the phone, i.e. in the direction perpendicular to the plane of drawing of FIG. 19 if the dimension of the phone in this direction is large enough. Preferably, the zoom lens comprises at least one folding mirror. Then at least the two electrowetting cells or, for the embodiment of FIG. 17, at least the two fixed lens elements are arranged along a line which is parallel to the front surface of the phone, which may then be relatively thin.

Another handheld apparatus wherein the invention may be implemented is a personal digital assistant (PDA) provided with a miniature camera. Such a camera with a zoom lens as described above may be arranged in the PDA in the same way as described for the mobile phone.

Figure 20:
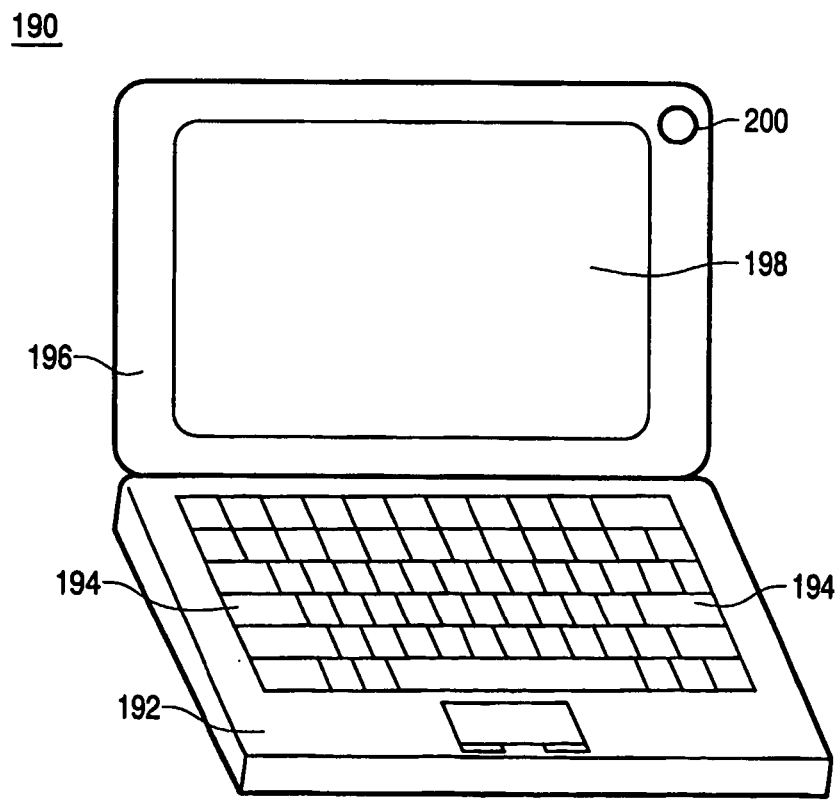
FIG. 20 shows a laptop computer provided with a camera which includes a zoom lens according to the invention.

FIG. 20 shows a laptop computer (notebook) as an example of a portable apparatus wherein the invention may be implemented. The laptop computer 190 comprises a base portion 192 into which a keyboard 195 and the processor unit are incorporated. A cover portion 196, which can be rotated with respect to the base portion, includes a display 198 and a miniature camera 200. Such a camera provided with a zoom lens as described above may be arranged in the laptop in the same way as described for the mobile phone.

The invention may be used not only in a camera for a handheld apparatus, like a mobile phone, a digital personal assistant, a pocket computer, and an electronic toy, or for a portable apparatus, but also in other types of built-in cameras. The invention may also be used in non-built-in cameras, like cameras for desktop computers, cameras for intercom systems, and pocket-sized and other-size cameras, for example digital cameras. The camera may be a still-picture (photo) camera or a video camera. It is irrelevant for the invention whether the camera uses a film or an electronic sensor, for example a CCD sensor or CMOS sensor.

The invention claimed is:

1. A zoom lens having at least a first fixed lens group, a second fixed lens group, and a controllable lens group, characterized in that the controllable lens group comprises a voltage-controlled electrowetting device, which device includes a first fluid and a second fluid having different refractive indices and comprises at least two first fluid-second fluid interfaces.

2. A zoom lens as claimed in claim 1 having a front lens group at its object side and a rear lens group at its image side, characterized in that the first lens group is the front lens group, the second lens group is the rear lens group, and the electrowetting device is arranged between the first lens group and the second lens group.

3. A zoom lens as claimed in claim 2, characterized in that the electrowetting device comprises one electrowetting cell having two first fluid-second fluid interfaces.

4. A zoom lens as claimed in claim 2, characterized in that the electrowetting device comprises a first electrowetting cell and a second electrowetting cell each having at least one first fluid-second fluid interface.

5. A zoom lens as claimed in claim 4, characterized in that each electrowetting cell has two first fluid-second fluid interfaces.

6. A zoom lens as claimed in claim 1, characterized in that the electrowetting device comprises a first and a second electrowetting cell each having one first fluid-second fluid interface, and in that a lens stop is arranged between the first and the second electrowetting cell.

7. A zoom lens as claimed in claim 6 having a front lens group at its object side and a rear lens group at its image side, characterized in that the first lens group is the front lens group and the second lens group is the rear lens group, and in that the electrowetting device is arranged between the first lens group and the second lens group.

8. A zoom lens as claimed in claim 6, characterized in that one electrowetting cell forms a front group and the second electrowetting cell forms the rear group, and in that the first lens group and the second lens group are arranged between the electrowetting cells, the lens stop being arranged between the first lens group and the second lens group.

9. A zoom lens as claimed in claim 1, characterized in that it comprises at least one folding mirror arranged between an electrowetting cell and one of the first and second lens groups.

10. A zoom lens as claimed in claim 9, characterized in that it comprises two folding mirrors, one at the object side portion and the other at the image side portion of the zoom lens.

11. A zoom lens as claimed in claim 1, characterized in that an electrowetting cell comprises:
a substantially cylindrical chamber having a cylinder wall, the fluid chamber containing a first fluid and an axially displaced second fluid, the fluids being non-miscible, in contact across a meniscus interface and having different indices of refraction,
a fluid contact layer arranged on the inside of the cylinder wall,
a first electrode separated from the first fluid and the second fluid by the fluid contact layer,
a second electrode acting on the second fluid,
the fluid contact layer having a wettability by the second fluid which varies under the application of a voltage between the first electrode and the second electrode, such that the shape of the meniscus varies in dependence on the said voltage,
wherein the wettability of the fluid contact layer by the second fluid is substantially equal on both sides of the intersection of the meniscus with the contact layer when no voltage is applied between the first and second electrodes.

12. A zoom lens as claimed in claim 11 comprising one electrowetting cell, characterized in that a second fluid is present on either side of the first fluid, the first fluid and the second fluids being in contact across respective first and second meniscus interfaces.

13. A zoom lens as claimed in claim 12, characterized in that a folding mirror is arranged between the front lens group and the electrowetting cell.

14. A zoom lens as claimed in claim 12, characterized in that a folding mirror is arranged between the electrowetting cell and the rear lens group.

15. A zoom lens as claimed in claim 11 comprising two electrowetting cells, characterized in that each cell has one meniscus interface and in that a lens stop is arranged between the cells.

16. A zoom lens as claimed in claim 11, characterized in that a second fluid is present on either side of the first fluid in each electrowetting cell, the first fluid and the second fluids being in contact across respective first and second meniscus interfaces.

17. A zoom lens as claimed in claim 15, characterized in that the two cells share one fluid chamber.

18. A zoom lens as claimed in claim 17, characterized in that the fluid chamber comprises at least one folding mirror formed by a reflective inclined portion of a fluid chamber wall, which mirror reflects incident radiation at an angle of substantially 90°.

19. A zoom lens as claimed in claim 18, characterized in that the fluid chamber comprises two folding mirrors, one at the object-side portion and the other at the image side portion of the zoom lens.

20. A zoom lens as claimed in claim 13, characterized in that the folding mirror at the image-side portion is integrated with the front lens group.

21. A zoom lens as claimed in claim 1, characterized in that the first fluid comprises an insulating liquid and the second fluid comprises a conducting liquid.

22. A zoom lens as claimed in claim 1, characterized in that the first fluid comprises a vapor and the second fluid comprises a conducting liquid.

23. A camera comprising a zoom lens, wherein the zoom lens comprises at least a first fixed lens group, a second fixed lens group, and a controllable lens group, characterized in that the controllable lens group comprises a voltage-controlled electrowetting device, which device includes a first fluid and a second fluid having different refractive indices and comprises at least two first fluid-second fluid interfaces.

24. A handheld apparatus comprising a camera, the camera comprising a zoom lens, wherein the zoom lens comprises at least a first fixed lens group, a second fixed lens group, and a controllable lens group, characterized in that the controllable lens group comprises a voltage-controlled electrowetting device, which device includes a first fluid and a second fluid having different refractive indices and comprises at least two first fluid-second fluid interfaces.

* * * * *